(12) United States Patent
Watanabe et al.

(10) Patent No.: US 11,809,533 B2
(45) Date of Patent: Nov. 7, 2023

(54) CONTROL DEVICE

(71) Applicant: FANUC CORPORATION, Yamanashi (JP)

(72) Inventors: Hirotoshi Watanabe, Yamanashi (JP); Masanori Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 222 days.

(21) Appl. No.: 17/079,753

(22) Filed: Oct. 26, 2020

(65) Prior Publication Data

US 2021/0150004 A1 May 20, 2021

(30) Foreign Application Priority Data

Nov. 19, 2019 (JP) ................................. 2019-208409

(51) Int. Cl.
*G06F 21/00* (2013.01)
*G06F 21/31* (2013.01)
*G05B 19/4155* (2006.01)

(52) U.S. Cl.
CPC ......... *G06F 21/31* (2013.01); *G05B 19/4155* (2013.01)

(58) Field of Classification Search
CPC ............................. G06F 21/31; G05B 19/4155
See application file for complete search history.

(56) References Cited

U.S. PATENT DOCUMENTS

| 10,761,793 | B2* | 9/2020 | Nishikawa | ............ G06F 3/1287 |
| 2014/0167931 | A1* | 6/2014 | Lee | ..................... H04L 12/2818 340/12.5 |
| 2014/0280715 | A1* | 9/2014 | Raniere | ................... H04L 67/75 709/217 |
| 2016/0337531 | A1* | 11/2016 | Masui | ................ H04N 1/00344 |
| 2018/0013853 | A1* | 1/2018 | Takahashi | ........... H04L 67/5681 |
| 2021/0067968 | A1* | 3/2021 | Ragusa | ................. H04W 12/50 |

FOREIGN PATENT DOCUMENTS

JP 06-110539 4/1994

\* cited by examiner

*Primary Examiner* — Joseph P Hirl
*Assistant Examiner* — Chi D Nguy
(74) *Attorney, Agent, or Firm* — Wenderoth, Lind & Ponack, L.L.P.

(57) ABSTRACT

A control device includes a storage unit that stores an authentication ledger, an authorization ledger, operation information, and operation recording target information. An authentication management unit, in a case of receiving authentication information from one information processing device, performs an authentication determination. An authorization unit determines whether to authorize the processing request of the one information processing device with the authorization ledger. An execution authorization unit, in a case in which the processing request authorized is a request for changing an operation state of the device, determines whether to authorize an execution of the processing request from the operation information, and, in a case of authorizing, causes the control execution unit to execute the processing request, and, in a case of not authorizing, transmits an error response to the one information processing device.

5 Claims, 7 Drawing Sheets

| AUTHORIZATION LEDGER | |
|---|---|
| REQUEST | AUTHORIZATION OF ATTRIBUTE OF USER A |
| SETTING CHANGE | AVAILABLE |
| SETTING ACQUISITION | AVAILABLE |
| OPERATION START | AVAILABLE |
| : | : |

| AUTHORIZATION LEDGER | |
|---|---|
| REQUEST | AUTHORIZATION OF ATTRIBUTE OF USER B |
| SETTING CHANGE | AVAILABLE |
| SETTING ACQUISITION | AVAILABLE |
| OPERATION START | UNAVAILABLE |
| : | : |

| OPERATION RECORDING TARGET INFORMATION TABLE | |
|---|---|
| SETTING CHANGE | STORAGE TARGET |
| SETTING ACQUISITION | OUT OF TARGET |
| OPERATION START | DETERMINATION TARGET |
| : | : |

| OPERATION INFORMATION TABLE | |
|---|---|
| USER A | SETTING CHANGE |
| USER A | SETTING CHANGE |
| USER B | SETTING CHANGE |
| : | : |

FIG. 8

CONTROL DEVICE

This application is based on and claims the benefit of priority from Japanese Patent Application No. 2019-208409, filed on 19 Nov. 2019, the content of which is incorporated herein by reference.

BACKGROUND OF THE INVENTION

Field of the Invention

The present invention relates to a control device.

Related Art

An information processing device such as a computer device is connected to a numerical control device via a network or the like to transmit requests for displaying data of the numerical control device, changing settings of the machine tool controlled by the numerical control device, starting automatic operation of the machine tool, remote diagnosis, and the like to the numerical control device. Thereafter, the numerical control device transmits a response to each request to the information processing device.

In this regard, a technique is known in which the numerical control device determines whether or not access authorization should be given based on the identification information of the user of the information processing device, and if the access is valid, the access to the internal information of the numerical control device is authorized, thereby preventing the internal information from leaking to the outside or being destroyed due to the illegal access. For example, refer to Patent Document 1.

Patent Document 1: Japanese Unexamined Patent Application, Publication No. H6-110539

SUMMARY OF THE INVENTION

However, with the standardization of networks and advances in technology in recent years, a plurality of information processing devices can be connected to a numerical control device. For example, in a case in which a request for the start of the automatic operation is received from an information processing device after a request for a setting change is received from another information processing device, the numerical control device executes the previously received setting change. Thereafter, the numerical control device only refers to the operation state of a machine tool to be controlled (e.g., in standby) to permit the operation execution. Therefore, the numerical control device starts the automatic operation even after a setting change from another information processing device is applied. It should be noted that the operation state includes, for example, "in standby" which indicates a state waiting for a command for the start of the operation, "under automatic operation" which indicates a state executing the operation, "during abnormality occurring" which indicates that an abnormality is occurring.

However, without the user of the information processing device who requested the start of the automatic operation knowing that the setting was changed by the user of another information processing device, the machine tool will execute the automatic operation. Due to this, for example, in a case in which a parameter directly related to the machine operation such as speed adjustment and movement amount change is included in the setting change, the operation is performed with unintentional settings, and hence, there is a risk of the machine tool causing a malfunction.

Therefore, it is desired to change the operation state without causing a malfunction even when a processing request for changing the operation state from any of a plurality of information processing devices is received.

An aspect of the control device according to the present disclosure is a control device that executes a processing request from a plurality of information processing devices, and the control device includes: a storage unit that stores an authentication ledger in which authentication information relating to a user of the plurality of information processing devices is stored, an authorization ledger in which access authorization for a request of each user is stored, operation information indicating a processing request executed on a device as a control target, and operation recording target information indicating whether each processing request to the device which is a control target is a target to be stored in the operation information; a control execution unit that executes control according to the processing request on the device which is the control target; and an authentication integrating function unit, in which the authentication integrating function unit includes an authentication management unit that, in a case of receiving authentication information relating to a user from one information processing device, compares the authentication information with the authentication ledger, and performs an authentication determination as to whether the user indicated by the authentication information is an authorized user; an authorization unit that determines whether a processing request from the one information processing device is a request to be authorized based on the authorization ledger; and an execution authorization unit that, in a case in which the processing request from the one information processing device authorized by the authorization unit is a request for changing an operation state of the device which is the control target, determines whether to authorize an execution of the processing request from the one information processing device based on at least the operation information; in a case of authorizing the execution of the processing request from the one information processing device, causes the control execution unit to execute the processing request from the one information processing device; and in a case of not authorizing the execution, transmits an error response to the one information processing device.

According to an aspect, it is possible to change the operation state without causing a malfunction, even when a processing request for changing the operation state from any of the plurality of information processing devices is received.

DETAILED DESCRIPTION OF THE INVENTION

Embodiment

First, an outline of the present embodiment will be explained. In the present embodiment, in a case of receiving authentication information relating to a user from one information processing device, a control device compares the authentication information with the authentication ledger to perform an authentication determination as to whether the user indicated by the authentication information is an authorized user. The control device determines whether a processing request from the one information processing device is a request to be authorized based on the authorization ledger. In a case in which the processing request from the one information processing device authorized by the authorization unit is a request for changing an operation state of the device which is the control target, the control device determines whether to authorize an execution of the processing request from the one information processing device based on at least the operation information. In a case of authorizing the execution of the processing request from the one information processing device, the control device causes the control execution unit to execute the processing request from the one information processing device, and in a case of not authorizing the execution, the control device transmits an error response to the one information processing device.

Thus, according to the present embodiment, it is possible to solve the object of changing the operation state without causing a malfunction, even when a processing request for changing the operation state from any of a plurality of information processing devices is received.

The outline of the present embodiment is described above.

Next, a detailed description will be given of the configuration of the present embodiment with reference to the drawings.

Figure 1:
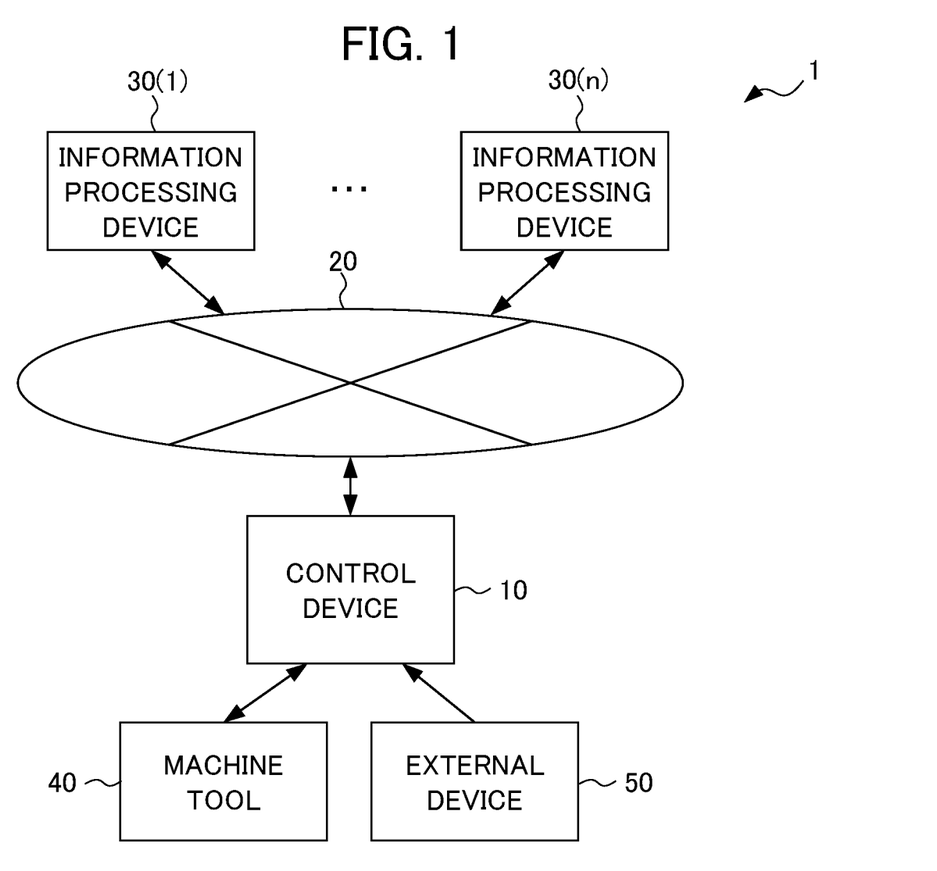
FIG. 1 is a functional block diagram showing a functional configuration example of a control system according to an embodiment.

FIG. 1 is a functional block diagram showing a functional configuration example of a control system according to an embodiment. As shown in FIG. 1, the control system 1 includes a control device 10, a network 20, information processing devices 30(1) to 30(n), a machine tool 40, and an external device 50 (n is an integer of 2 or more).

The control device 10 and the information processing devices 30(1) to 30(n) may be connected to each other via the network 20 such as a LAN (Local Area Network) or the Internet. In this case, the control device 10 and the information processing devices 30(1) to 30(n) are each provided with a communication unit (not shown) for mutually communicating by such a connection.

Furthermore, the control device 10, the machine tool 40, and the external device 50 may be directly connected to each other via a connection interface (not shown).

It should be noted that the control device 10 and the information processing devices 30(1) to 30(n) may be directly connected to each other via a connection interface (not shown). Furthermore, the control device 10, the machine tool 40, and the external device 50 may be connected to each other via the network 20.

The control device 10 is a numerical control device known to those skilled in the art, and generates an operation command based on the control information, and transmits the generated operation command to the machine tool 40. Thus, the control device 10 controls the operation of the machine tool 40. It should be noted that, in a case in which the machine tool 40 is a robot or the like, the control device 10 may be a robot controller or the like.

Furthermore, the device of the control target of the control device 10 is not limited to the machine tool 40 and the robot, and thus, it can be widely applied to the industrial machine in general. Examples of the industrial machines include a machine tool, an industrial robot, a service robot, a forging machine and an injection molding machine.

The information processing devices 30(1) to 30(n) are computer devices or the like, and receive input of various processing requests from a user via input devices (not shown) such as a keyboard and a touch screen included in each of the information processing devices 30(1) to 30(n). Each of the information processing devices 30(1) to 30(n) transmits the received processing request to the control device 10. Furthermore, each of the information processing devices 30(1) to 30(n) receives a response to the transmitted processing request from the control device 10, and displays the response on a display device (not shown) such as a liquid crystal display included in each of the information processing devices 30(1) to 30(n).

Hereinafter, in a case in which it is not necessary to individually distinguish each of the information processing devices 30(1) to 30(n), these are collectively referred to as "information processing device 30".

The external device 50 is, for example, a facility management device or the like, and monitors the external state of the control device 10. The external device 50 transmits a signal indicating the external state of the monitored control device 10 to the control device 10.

<Control Device 10>

Figure 2:
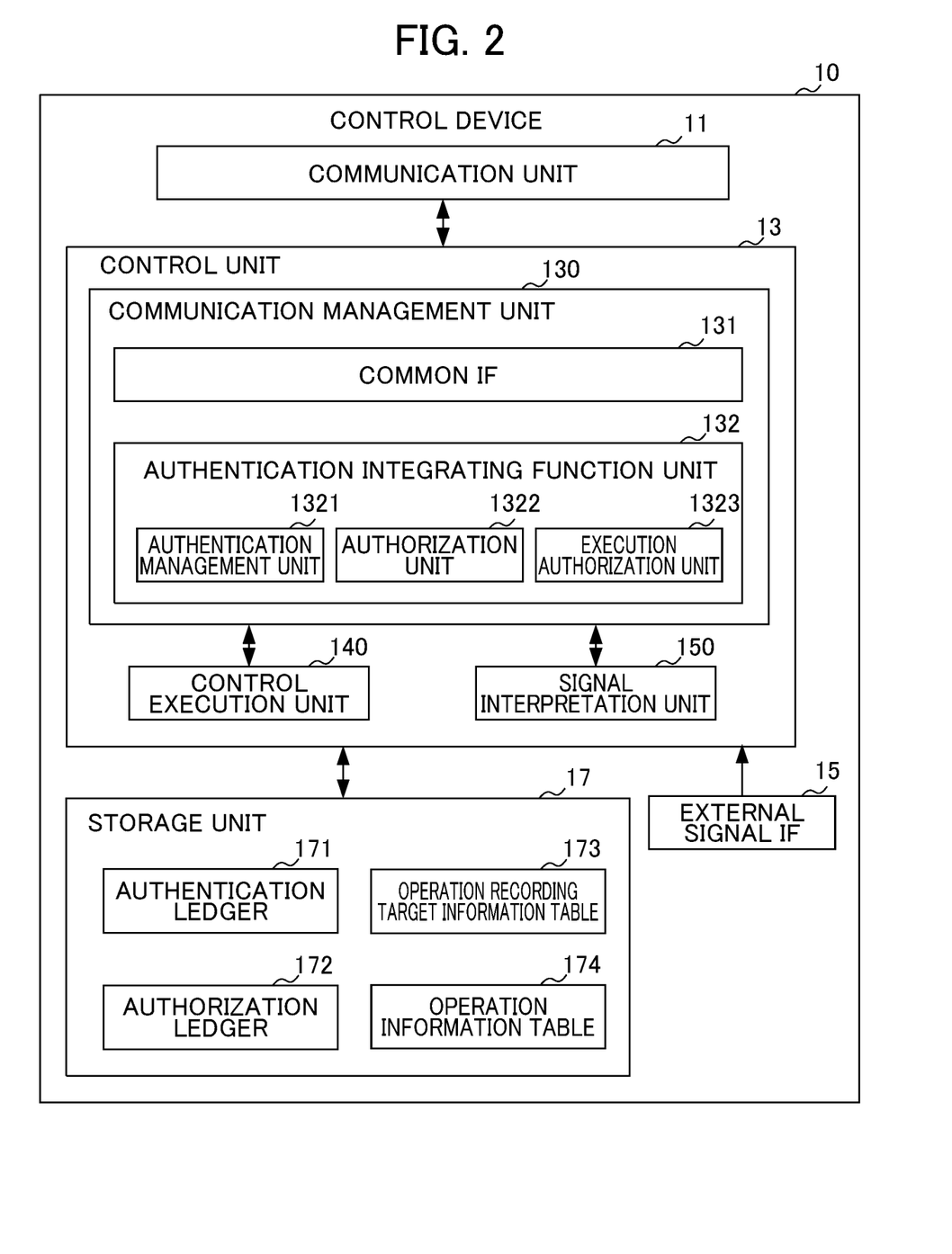
FIG. 2 is a block diagram showing the configuration of a control device.

FIG. 2 is a block diagram showing a configuration of the control device 10.

As shown in FIG. 2, the control device 10 includes a communication unit 11, a control unit 13, an external signal IF 15, and a storage unit 17. Furthermore, the control unit 13 includes a communication management unit 130, a control execution unit 140, and a signal interpretation unit 150. In addition, the communication management unit 130 includes a common IF 131 and an authentication integrating function unit 132. The authentication integrating function unit 132 further includes an authentication management unit 1321, an authorization unit 1322, and an execution authorization unit 1323.

The communication unit 11 receives the authentication information and the processing request of the user transmitted from the information processing device 30, and outputs the received authentication information and the processing request to the control unit 13 to be described later. In addition, the communication unit 11 transmits a response from the control unit 13 to the information processing device 30.

It should be noted that, in a case in which the protocol is different for each information processing device 30, the communication unit 11 may receive the authentication information or the processing request based on the protocol for each information processing device 30, and transmit a response from the control unit 13.

The external signal IF (Interface) 15 receives a signal indicating the external state of the control device 10 from the external device 50, and outputs the received signal to the signal interpretation unit 150 to be described later. Furthermore, the external signal IF 15 may receive a signal indicating the dynamic detection detected by an acceleration sensor (not shown) disposed in the control device 10 from the acceleration sensor (not shown). Thereafter, the external signal IF 15 may output the received signal to the signal interpretation unit 150, which will be described later. Furthermore, the external signal IF 15 may receive from the operation panel (not shown) a signal of the key operation by the user via an operation panel (not shown) such as MDI (Manual Data Input) installed in the control device 10. Thereafter, the external signal IF 15 may output the received signal to a signal interpretation unit 150, which will be described later.

<Storage Unit 17>

The storage unit 17 is RAM (Random Access Memory), an HDD (Hard Disk Drive) or the like. The storage unit 17 includes an authentication ledger 171, an authorization ledger 172, an operation recording target information table 173, and an operation information table 174.

Figure 3:
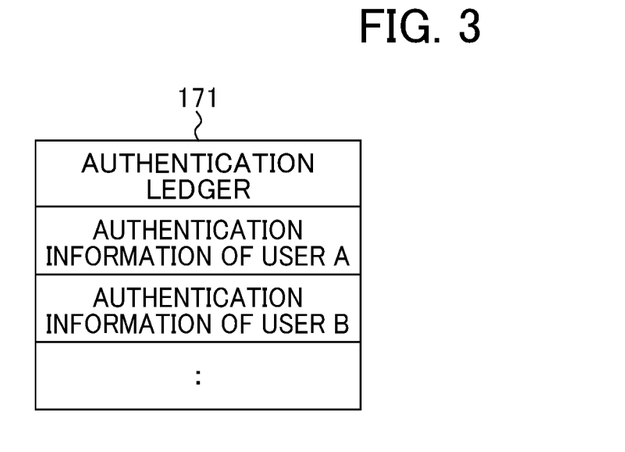
FIG. 3 is a diagram showing an example of an authentication ledger.

FIG. 3 is a diagram showing an example of the authentication ledger 171.

As shown in FIG. 3, authentication information (membership, ID, password, attribute, etc.) of each user such as user A and user B is set and registered in the authentication ledger 171 in advance.

Figure 4:
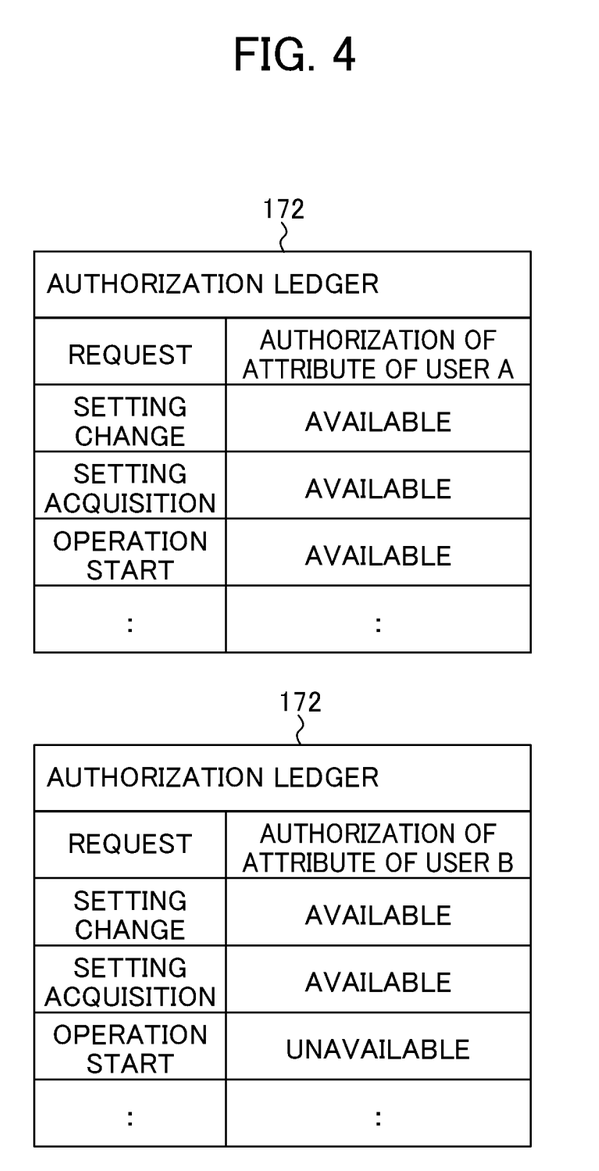
FIG. 4 is a diagram showing an example of an authorization ledger.

FIG. 4 is a diagram showing an example of the authorization ledger 172.

As shown in FIG. 4, the authorization ledger 172 is generated and stored for each user registered in the authentication ledger 171 of FIG. 3. In the authorization ledger 172 of user A in the upper part of FIG. 4, "available" is set for the processing requests for "setting change", "setting acquisition" and "operation start" for user A. On the other hand, in the authorization ledger 172 of user B in the lower stage of FIG. 4, "available" is set for the processing requests for "setting change" and "setting acquisition" for user B, and "unavailable" is set for the processing request for "operation start".

Figure 5:
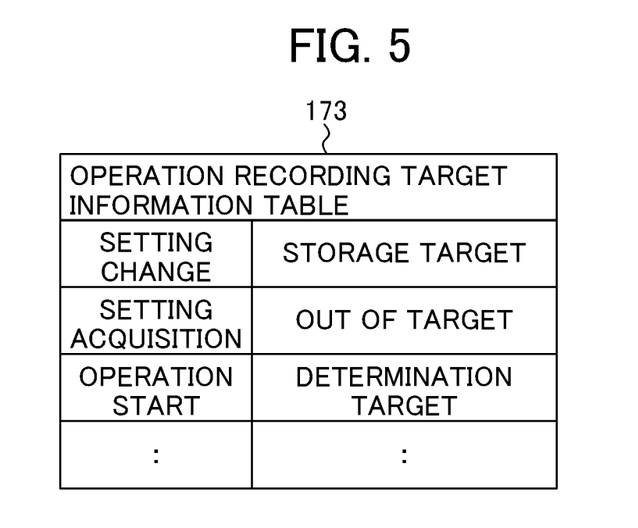
FIG. 5 is a diagram showing an example of an operation recording target information table.

FIG. 5 is a diagram showing an example of the operation recording target information table 173.

As shown in FIG. 5, the operation recording target information table 173 is a table in which whether or not each of the processing requests requested from the information processing device 30 is a storage target stored in the operation information table 174 to be described later is set in advance. For example, in the operation recording target information table 173, "storage target" is set in response to the processing request for "setting change". Furthermore, in the operation recording target information table 173, "out of target" is set as a non-storage target in response to the processing request for "setting acquisition". Furthermore, in the operation recording target information table 173, "determination target" is set as a determination target of control processing described later, although it is not a storage target in response to the processing request for "operation start".

Figure 6:
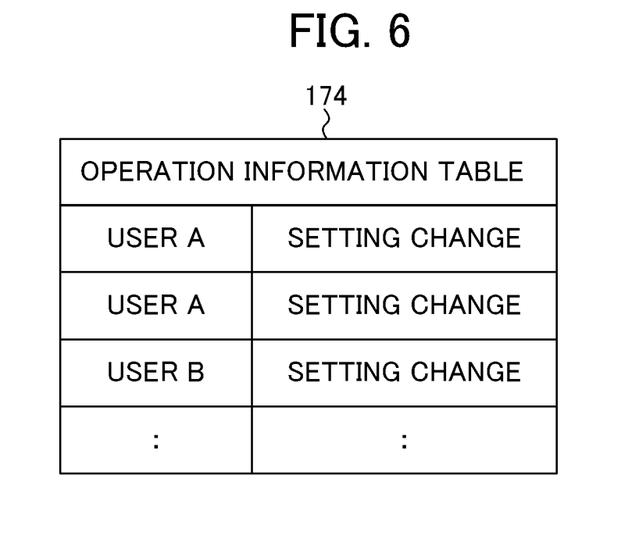
FIG. 6 is a diagram showing an example of an operation information table.

FIG. 6 is a diagram showing an example of the operation information table 174.

As shown in FIG. 6, the operation information table 174 is a table that stores a processing request which is set as a storage target in the operation recording target information table 173 and which has been executed by the control execution unit 140 to be described later, among the processing requests requested from the information processing device 30. For example, the operation information table 174 stores the user who requested the processing request for the storage target and the processing request executed.

It should be noted that the operation information table 174 may store the contents of the processing request executed.

Furthermore, the operation information table 174 may not necessarily store a processing request during execution.

Furthermore, as will be described later, for example, in a case in which the processing request for changing the operation state of the machine tool 40 such as "operation start" is received and the operation state of the control execution unit 140 changes, or in a case in which the power supply of the control device 10 is turned off, the operation information table 174 may be initialized.

It should be noted that the storage unit 17 may store at least a changed error and user data notified to the information processing device 30 by the authentication integrating function unit 132, which will be described later, as error information, together with the authentication ledger 171, the authorization ledger 172, the operation recording target information table 173, and the operation information table 174.

<Control Unit 13>

The control unit 13 includes a CPU (Central Processing Unit), ROM (Read Only Memory), RAM, CMOS (Complementary Metal-Oxide-Semiconductor) memory, and the like, which are configured to be able to communicate with each other via a bus, and are well known to those skilled in the art.

The CPU is a processor that generally controls the control device 10. The CPU reads the system program and the application program stored in the ROM through the bus and controls the entire control device 10 in accordance with the system program and the application program. Thus, as shown in FIG. 2, the control unit 13 is configured to realize the functions of the communication management unit 130, the control execution unit 140, and the signal interpretation unit 150. Various data such as temporary calculation data and display data are stored in the RAM. The CMOS memory is backed up by a battery (not shown), and is configured as non-volatile memory in which a stored state is retained even when the power of the control device 10 is turned off.

The communication management unit 130 includes the common IF 131 and the authentication integrating function unit 132, which will be described later.

The common IF 131 is an interface for outputting the authentication information and the processing requests received from each of the information processing device 30 through the communication unit 11 to the authentication integrating function unit 132. In addition, the common IF 131 outputs a response from the authentication integrating function unit 132 to the communication unit 11.

Furthermore, for example, even if the protocol differs for each information processing device 30, the common IF 131 may output the authentication information and the processing requests from the information processing device 30 received by the communication unit 11 to the authentication integrating function unit 132, and output the response from the authentication integrating function unit 132 to the communication unit 11.

The authentication integrating function unit 132 determines whether or not the user of the information processing device 30 is authorized to access the control device 10 based on the authentication information received via the common IF 131, and determines whether or not to execute the processing request received.

For example, the authentication management unit 1321 receives the connection source information relating to the information processing device 30 and the authentication information relating to the user from the information processing device 30. It should be noted that the connection source information is, for example, network information including an IP address and a port number of the authorized information processing device 30.

Furthermore, the authentication management unit 1321 compares the membership, ID, password, attribute, and the like included in the received authentication information and the authentication ledger 171, and determines whether or not the user indicated by the authentication information is an authorized user. In a case of being determined that the user indicated by the authentication information is an authorized user, the authentication management unit 1321 may provide information regarding the user of which information processing device 30 has accessed the authorization unit 1322 to be described later. Furthermore, the authentication management unit 1321 may provide information regarding the user of which information processing device 30 has transmitted the processing request to the execution authorization unit 1323 to be described later.

It should be noted that, in a case in which it is determined that the user indicated by the authentication information is not an authorized user, the authentication management unit 1321 transmits a response of the authentication error to the information processing device 30 through the common IF 131 and the communication unit 11.

The authorization unit 1322 determines, based on the authorization ledger 172, whether or not the processing request from the information processing device 30 is authorized, that is, whether or not the user is authorized to execute the processing request. For example, in a case of receiving the processing request for "setting change" from user A of the information processing device 30, the authorization unit 1322 authorizes the processing request for "setting change" from user A based on the authorization ledger 172 shown in the upper part of FIG. 4.

On the other hand, in a case of receiving the processing request for "setting change" from user B of the information processing device 30, the authorization unit 1322 does not authorize the processing request for "setting change" from user B based on the authorization ledger 172 shown in the lower part of FIG. 4. In this case, the authorization unit 1322 transmits an error response indicating that the processing request is not authorized to the information processing device 30 via the common IF 131 and the communication unit 11.

In a case in which the processing request from user A of the information processing device 30 authorized by the authorization unit 1322 is a request for changing the operation state of the machine tool 40 as a control target, the execution authorization unit 1323 determines whether or not to authorize the execution of the processing request based on at least the operation information table 174.

More specifically, for example, in a case in which the processing request from user A of the information processing device 30 is "setting change", since the processing request does not change the operation state of the machine tool 40, the execution authorization unit 1323 causes the control execution unit 140 to be described later to execute the processing request for "setting change" from user A. Thereafter, the execution authorization unit 1323 may store the processing request for the "setting change" from user A in the operation information table 174 based on the operation recording target information table 173.

On the other hand, in a case in which the processing request from user A of the information processing device 30 is "operation start", since the processing request is intended to change the operation state of the machine tool 40 from "in standby" to "automatic operation", for example, the execution authorization unit 1323 refers to the operation information table 174. It should be noted that examples of the change of the operation state include the change from "under preparation" to "in standby" by the preparation complete operation by button pressing provided in the control device 10 and the machine tool 40, and the change from "in standby" to "under automatic operation" by the processing request for "operation start". Furthermore, examples of the change of the operation state include the change from "under automatic operation" to "during operation stop" with the operation request for "operation interruption", and the change from any operation state to "during abnormality occurring" with an emergency stop button pressing provided in the control device 10 and the machine tool 40.

In this case, the execution authorization unit 1323 refers to the operation information table 174, and determines whether or not a processing request such as a setting change by another user is recorded. As shown in FIG. 6, in a case in which the setting change by user B is recorded in the operation information table 174, the execution authorization unit 1323 determines that the processing request for "operation start" of user A cannot be executed. The execution authorization unit 1323 may transmit the response of the changed error to the information processing device 30 of user A through the common IF 131 and the communication unit 11, and store the fact that the changed error was transmitted to user A in the storage unit 17 as the error information.

It should be noted that, in a case in which the processing request for the setting change by another user other than user A is not recorded in the operation information table 174, the execution authorization unit 1323 determines that the execution of the processing request for the "operation start" of user A is authorized, and causes the control execution unit 140 to execute the processing request for the "operation start" to be described later. In this case as well, the execution authorization unit 1323 may initialize (reset) the operation information table 174. By doing so, after completion of the processing request of user A, it is possible for another user to execute a processing request for changing the operation state of the machine tool 40 such as "operation start".

The control execution unit 140 receives a processing request authorized by the execution authorization unit 1323 via, for example, a control IF (not shown), and executes control processing corresponding to the received processing request on the machine tool 40.

It should be noted that the abovementioned execution authorization unit 1323 may acquire the operation state of the control execution unit 140 (hereinafter, also referred to as "operation state of the control execution unit 140") as the operation state of the machine tool 40.

The signal interpretation unit 150, for example, receives a signal indicating the external state of the control device 10 from the external device 50 via an external signal IF 15, and interprets the operation state of the machine tool 40 from the received signal. For example, the signal interpretation unit 150 interprets that the operation state of the machine tool 40 is "operation stop" in a case in which the received signal is in the stop state according to the facility signal.

Furthermore, the signal interpreting unit 150 may receive a signal indicating the dynamic detection detected by the acceleration sensor (not shown) disposed in the control device 10 (not shown) from the acceleration sensor (not shown) via the external signal IF 15. The signal interpretation unit 150 may interpret that the operation state of the machine tool 40 is "decelerating operation" in a case in which the acceleration sensor (not shown) detects the movement of a person or an object based on the received signal.

Furthermore, the signal interpretation unit 150 may receive from the operation panel (not shown) a signal of the key operation by the user through the operation panel (not shown) of the control device 10 via the external signal IF 15. In a case in which the received signal indicates a key operation by a person, the signal interpretation unit 150 may interpret that the operation state of the machine tool 40 is "in operation".

It should be noted that, in a case in which the signal is not received from the external device 50, the acceleration sensor (not shown), or the operation panel (not shown), the signal interpretation unit 150 may interpret that the operation state of the machine tool 40 is "normal operation".

Thus, the above-mentioned execution authorization unit 1323 may determine the operation state of the machine tool 40 by acquiring the interpretation result of the signal interpretation unit 150 (hereinafter, also referred to as the "signal state of the signal interpretation unit 150"). By doing so, the execution authorization unit 1323 can acquire the operation state of the machine tool 40, which is difficult for the control execution unit 140 to manage.

<Control Processing of Control Device 10>

Next, operation relating to the control processing of the control device 10 according to the present embodiment will be described.

Figure 7:
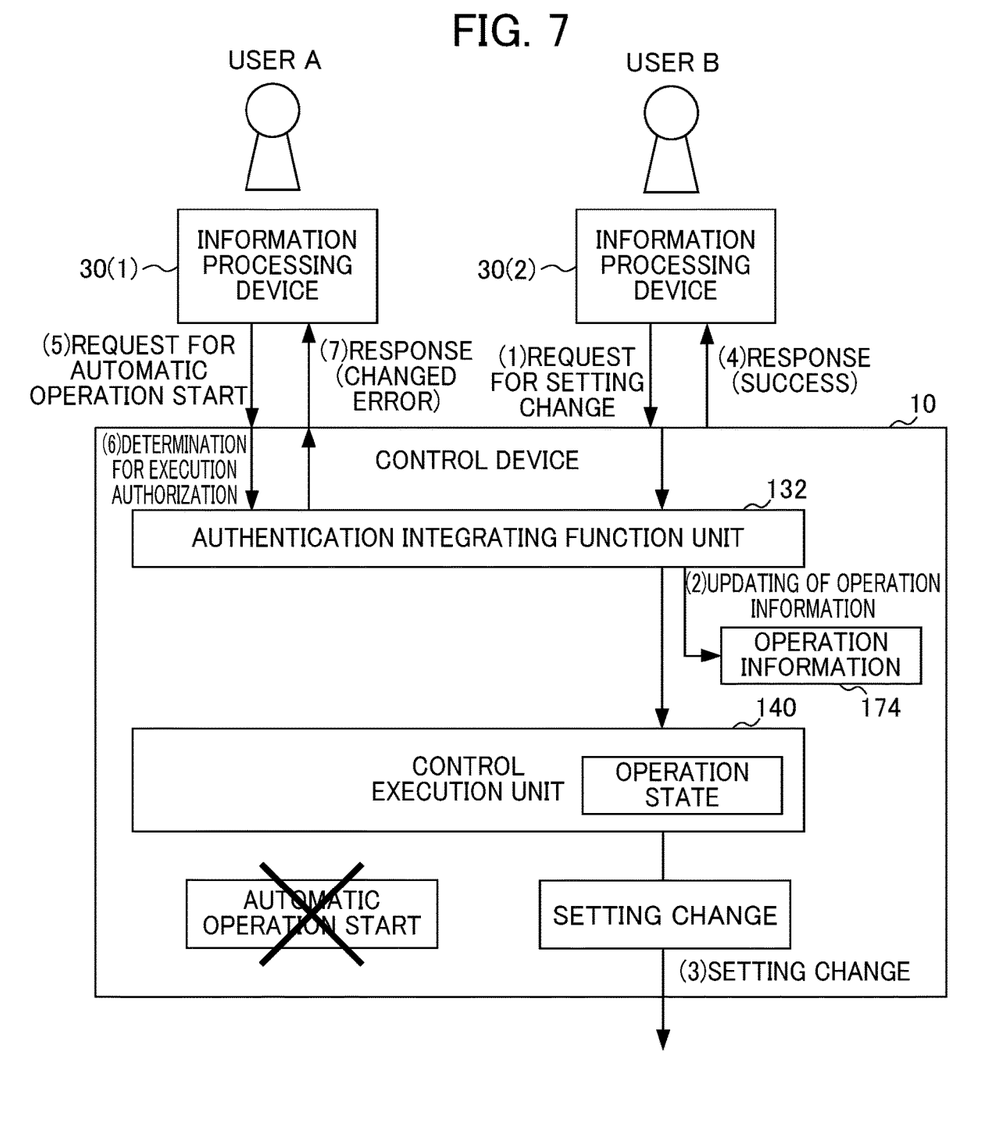
FIG. 7 is a diagram showing an example of the outline of control processing of the control device.

FIG. 7 is a diagram showing an example of an outline of the control processing of the control device 10.

FIG. 7 shows a case in which user A of the information processing device 30(1) and user B of the information processing device 30(2) have been authenticated by the control device 10.

(1) The information processing device 30(2) transmits a processing request for setting change to the control device 10.

(2) The authentication integrating function unit 132 (the execution authorization unit 1323) updates the operation information table 174 as shown in FIG. 6.

(3) The authentication integrating function unit 132 (the execution authorization unit 1323) causes the control execution unit 140 to change the setting.

(4) The authentication integrating function unit 132 notifies the information processing device 30(2) of the response (success).

(5) The information processing device 30(1) transmits a processing request for starting the automatic operation to the control device 10.

(6) The authentication integrating function unit 132 (the execution authorization unit 1323) determines that the execution is not possible because the processing request of another user is being processed from the operation information table 174 of (2).

(7) The authentication integrating function unit 132 notifies the information processing device 30(1) of the response (changed error).

According to the abovementioned (6) and (7), even when the control device 10 receives the processing request from the information processing device 30(1) for changing the operation state of the machine tool 40, it is possible to avoid causing the machine tool 40 to be operated with an unintentional setting for user A, and it is possible to reduce the risk of causing a malfunction.

Figure 8:
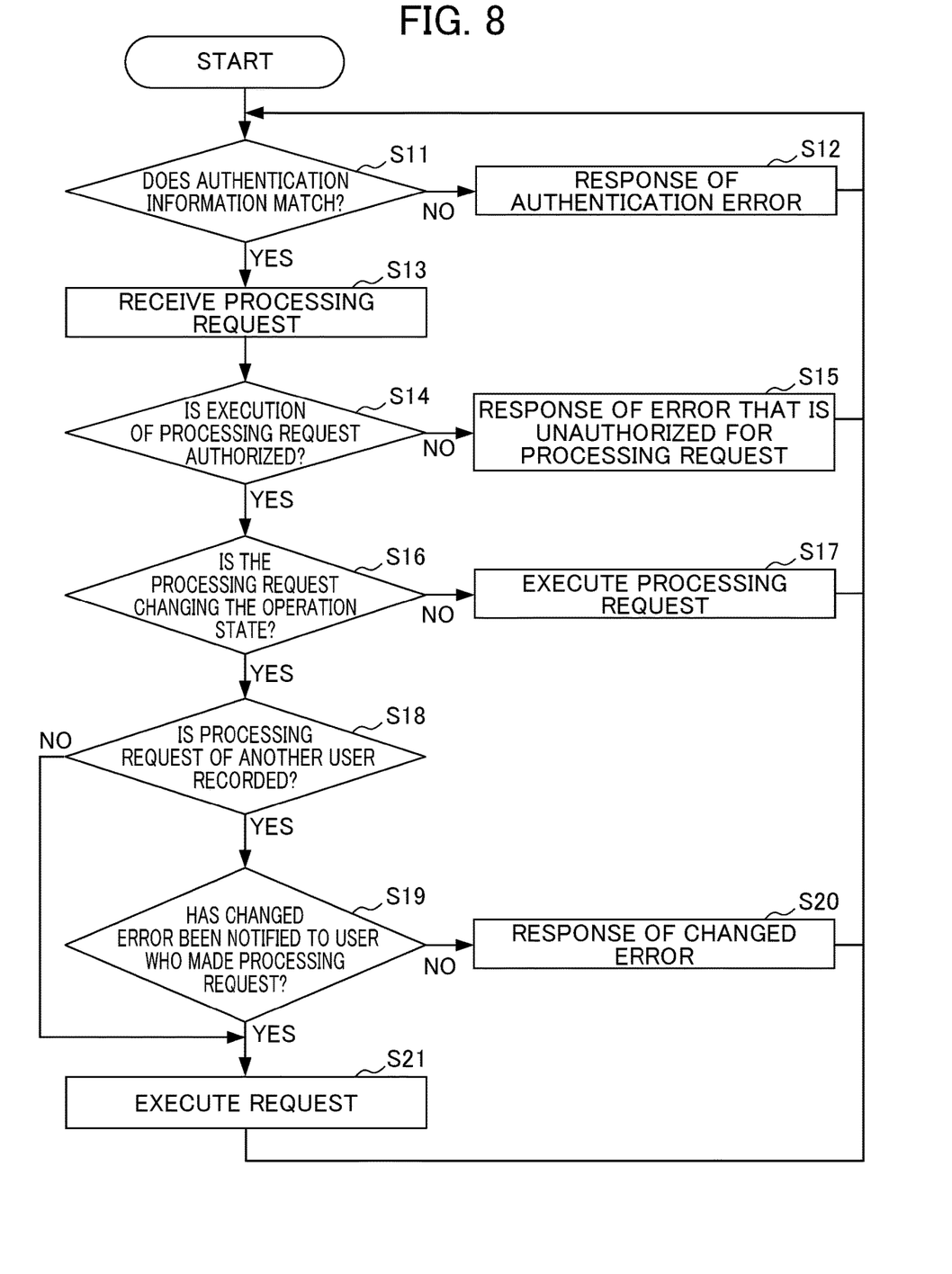
FIG. 8 is a flowchart for explaining the control processing of the control device.

FIG. 8 is a flowchart for explaining the control processing of the control device 10. The flow shown here is repeatedly executed as long as the power of the control device 10 or the machine tool 40 is turned OFF or no abnormality occurs in the machine tool 40.

It should be noted that the case of user A will be described below; however, the same applies to other users such as user B.

In Step S11, in a case of receiving the authentication information of user A from the information processing device 30 through the communication unit 11 and the common IF 131, the authentication management unit 1321 determines whether or not the received authentication information of user A matches the authentication ledger 171, i.e., whether or not user A is a user who is authorized to access the control device 10. If user A is an authorized user, the processing advances to Step S13. On the other hand, if user A is not an authorized user, the processing advances to Step S12.

In Step S12, the authentication management unit 1321 notifies the information processing device 30 of user A of the response of the authentication error. Then, the processing returns to Step S11.

In Step S13, the authorization unit 1322 receives a processing request from the information processing device 30 of user A via the communication unit 11 and the common IF 131.

In Step S14, the authorization unit 1322 determines whether or not the processing request received in Step S13 is an authorized request, i.e., whether or not user A is authorized to execute the processing request, based on the authorization ledger 172. If user A is authorized to execute the processing request, the processing advances to Step S16. On the other hand, if user A is not authorized to execute the processing request, the processing advances to Step S15.

In Step S15, the authorization unit 1322 notifies the information processing device 30 of user A of the response of the error that is unauthorized for the processing request. Then, the processing returns to Step S11.

In Step S16, the execution authorization unit 1323 determines whether or not the processing request for user A received in Step S13 is a request for changing the operation state of the machine tool 40. If the processing request is a request for changing the operation state, the processing advances to Step S18. On the other hand, if the processing request is not a request for changing the operation state, the process advances to Step S17.

In Step S17, the execution authorization unit 1323 causes the control execution unit 140 to execute the processing request of user A received in Step S13. The execution authorization unit 1323 stores user A and the processing request in the operation information table 174 in a case in which processing request of user A is a storage target stored in the operation information table 174 based on the operation recording target information table 173, and the execution of the processing request by the control execution unit 140 ended. Then, the processing returns to Step S11.

It should be noted that, before causing the control execution unit 140 to execute the processing request of user A received in Step S13, the execution authorization unit 1323 may determine whether or not the machine tool 40 can execute the processing request of user A based on the operation state of the control execution unit 140 and the signal state of the signal interpretation unit 150.

In Step S18, the execution authorization unit 1323 determines whether or not a processing request such as "setting change" of another user other than user A is recorded based on the operation information table 174. In a case in which the processing request such as "setting change" of another user is recorded, the processing advances to Step S19. On the other hand, in a case in which the processing request such as "setting change" of another user is not recorded, the processing advances to Step S21.

In Step S19, based on the error information stored in the storage unit 17, the execution authorization unit 1323 determines whether or not a changed error has been notified to the processing request of user A. If user A has been notified of the changed error, the processing advances to Step S21. On the other hand, if user A has not been notified of the changed error, the processing advances to Step S20.

In Step S20, the execution authorization unit 1323 notifies the information processing device 30 of user A of the response of the changed error. The execution authorization unit 1323 stores, as error information, the notification of the changed error to user A in the storage unit 17. Then, the processing returns to Step S11.

In Step S21, the execution authorization unit 1323 causes the control execution unit 140 to execute the processing request of user A received in Step S13. Then, the processing returns to Step S11.

It should be noted that, before causing the control execution unit 140 to execute the processing request of user A received in Step S13, the execution authorization unit 1323 may determine whether or not the machine tool 40 is in a state capable of executing the processing request of user A based on the operation state of the control execution unit 140 and the signal state of the signal interpretation unit 150. Furthermore, the execution authorization unit 1323 may initialize the operation information table 174 in a case in which the execution of the processing request of user A by the control execution unit 140 is completed.

As described above, in a case of receiving the processing request from the user of the authenticated information processing device 30, the control device 10 according to an embodiment determines whether or not the user's processing request is authorized to execute the processing request based on the authorization ledger 172 in which the access authorization for each request for each user is stored. In a case in which the authorized processing request is a request for changing the operation state of the machine tool 40, the control device 10 determines whether or not to authorize execution of the processing request based on at least the operation information table 174. In a case in which the execution is authorized, the control device 10 executes changing the operation state of the processing request, and in a case in which the execution is not authorized, the control device 10 transmits an error response to the information processing device 30.

Thus, it is possible for the control device 10 to change the operation state without causing a malfunction even when a request for changing the operation state from any of the plurality of information processing device 30 is received.

In addition, since the control device 10 can appropriately respond with a processing request that should not be received essentially defined as an error, even if there are a plurality of processing requests from a plurality of information processing devices 30, it is still possible to reduce a factor causing a malfunction.

Although an embodiment has been described above, the control device 10 is not limited to the embodiment described above, and includes modifications, improvements, and the like within a range that can achieve the object.

Modification Example 1

In the embodiment described above, as shown in FIG. 7, the execution authorization unit 1323 of the authentication integrating function unit 132 notifies the information processing device 30(1) of the response of the changed error in a case of receiving the processing request of the automatic operation start from the information processing device 30(1) of user A after a processing request for the setting change from the information processing device 30(2) of user B being executed; however, the present invention is not limited thereto. For example, based on the authentication ledger 171 and the operation information table 174, the execution authorization unit 1323 may add the information of user B in which the processing request of the storage target stored in the operation information table 174 such as "setting change" is made most recently to the changed error.

By doing so, it is possible for the control device 10 to prevent user A from starting the operation while user A assumes the setting previously set. In addition, it is possible for user A to confirm by contacting user B because user B has changed the setting and thus knows the setting.

It should be noted that each function included in the control device 10 according to the embodiment can be realized by hardware, software, or a combination thereof. Here, being realized by software means being realized by a computer reading and executing a program.

The programs can be stored on any of various types of non-transitory computer readable media and provided to a computer. The non-transitory computer readable media include various types of tangible storage media. Examples of non-temporary computer readable media include magnetic recording media (e.g., flexible disks, magnetic tapes, hard disk drives), magneto-optical media (e.g., magneto-optical disks), CD-ROM (Read Only Memory), CD-R, CD-R/W, semiconductor memory (e.g., mask ROM, PROM (Programmable ROM), EPROM (Erasable PROM), flash ROM, and RAM. The programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical wire, an optical fiber, or the like, or through a wireless communication path.

A step of writing programs to be recorded on a recording medium includes processing that is performed in a time series manner according to the order and processing that is performed in a parallel or independent manner even if the processing is not necessarily performed in a time series manner.

In other words, the control device of the present disclosure can assume various embodiments having the following configurations.

(1) The control device 10 according to the present disclosure is a control device that executes a processing request from a plurality of information processing devices 30, and the control device includes: a storage unit 17 that stores an authentication ledger 171 in which authentication information relating to a user of the plurality of information processing devices 30 is stored, an authorization ledger 172 in which access authorization for a request of each user is stored, operation information table 174 indicating a processing request executed on a machine tool 40, and operation recording target information table 173 indicating whether each processing request to the machine tool 40 is a target to be stored in the operation information table 174; a control execution unit 140 that executes control according to the processing request on the machine tool 40; and an authentication integrating function unit 132, in which the authentication integrating function unit 132 includes an authentication management unit 1321 that, in a case of receiving authentication information relating to a user from one information processing device 30, compares the authentication information with the authentication ledger 171, and performs an authentication determination as to whether the user indicated by the authentication information is an authorized user; an authorization unit 1322 that determines whether a processing request from the one information processing device 30 is a request to be authorized based on the authorization ledger 172; and an execution authorization unit 1323 that, in a case in which the processing request from the one information processing device 30 authorized by the authorization unit 1322 is a request for changing an operation state of the machine tool 40 which is the control target, determines whether to authorize an execution of the processing request from the one information processing device 30 based on at least the operation information 174; in a case of authorizing the execution of the processing request from the one information processing device 30, causes the control execution unit 140 to execute the processing request from the one information processing device 30; and in a case of not authorizing the execution, transmits an error response to the one information processing device 30.

According to the control device 10, it is possible to change the operation state without causing a malfunction, even when a processing request for changing the operation state from any of the plurality of information processing device 30 is received.

(2) The control device 10 according to (1) above further may include a signal interpretation unit 150 that receives a signal from outside, and interprets an operation state of the machine tool 40 from the signal received, in which the execution authorization unit 1323 may determine whether to authorize the execution of the processing request from the one information processing device 30 based on an operation state of the machine tool 40 indicated by the control execution unit 140 and an operation state of the machine tool 40 indicated by the signal interpretation unit 150, together with the operation information 174.

In so doing, it is possible for the control device 10 to acquire a more accurate operation state of the machine tool 40 and change the operation state without causing a malfunction.

(3) In the control device 10 according to (1) or (2) above, in a case in which the processing request from the one information processing device 30 is executed as a request for changing the operation state of the machine tool 40, the execution authorization unit 1323 may initialize the operation information 174.

By doing so, after completion of the processing request of a user, it is possible for the other user to execute the processing request for changing the operation state of the machine tool 40.

(4) In the control device 10 according to any one of (1) to (3), in a case in which a processing request from another information processing device 30 is stored in the operation information 174 at a time of receiving a processing request from the one information processing device 30, the execution authorization unit 1323 may transmit the error response to the one information processing device 30.

By doing so, it is possible to avoid starting operation while the user of the information processing device 30 is assumed to have previously set the setting.

(5) In the control device 10 according to (4) above, the execution authorization unit 1323 may transmit the error response to the one information processing device 30 by adding data indicating the other information processing device 30.

With such a configuration, since the user of the information processing device 30 knows the user of the other information processing device 30 whose setting has been changed, it is possible to confirm by contacting the user of the other information processing device 30.

EXPLANATION OF REFERENCE NUMERALS

1 control system
10 control device
132 authentication integrating function unit
1321 authentication management unit
1322 authorization unit
1323 execution authorization unit
140 control execution unit
150 signal interpretation unit
17 storage unit
171 authentication ledger
172 authorization ledger
173 operation recording target information table
174 operation information table
30(1) to 30(n) information processing device
40 machine tool
50 external device

What is claimed is:

1. A control device that executes a processing request from a plurality of information processing devices, the control device comprising:
   a storage unit that stores an authentication ledger in which authentication information relating to a user of the plurality of information processing devices is stored, an authorization ledger in which access authorization for a request of each user is stored, operation information indicating a processing request executed on a device as a control target, and operation recording target information indicating whether each processing request to the device which is a control target is a target to be stored in the operation information;
   a control execution unit that executes control according to the processing request on the device which is the control target; and
   an authentication integrating function unit,
   wherein the authentication integrating function unit includes
   an authentication management unit that, in a case of receiving authentication information relating to a user from one information processing device, compares the authentication information with the authentication ledger, and performs an authentication determination as to whether the user indicated by the authentication information is an authorized user;
   an authorization unit that determines whether a processing request from the one information processing device is a request to be authorized based on the authorization ledger; and
   an execution authorization unit that, in a case in which the processing request from the one information processing device authorized by the authorization unit is a request for changing an operation state of the device which is the control target, the operation state being requested to be changed is between any of a standby state, an automatic operation execution state, and a state in which an abnormality is occurring, determines whether to authorize an execution of the processing request from the one information processing device based on at least the operation information, the operation information including a different processing request from another information processing device, the different processing request is a request for changing a setting of the device which is the control target; in a case of authorizing the execution of the processing request from the one information processing device, causes the control execution unit to execute the processing request from the one information processing device; and in a case of not authorizing the execution, transmits an error response to the one information processing device, wherein, execution of the processing request from the one information processing device is determined to be authorized if the user has previously received the error response at the one information processing device.

2. The control device according to claim 1, further comprising a signal interpretation unit that receives a signal from outside, and interprets an operation state of the device as a control target from the signal received, wherein the execution authorization unit determines whether to authorize the execution of the processing request from the one information processing device based on an operation state of the device which is the control target indicated by the control execution unit and an operation state of the device which is the control target indicated by the signal interpretation unit, together with the operation information.

3. The control device according to claim 1, wherein, in a case in which the processing request from the one information processing device is executed as a request for changing the operation state of the device which is the control target, the execution authorization unit initializes the operation information.

4. The control device according to claim 1, wherein, in a case in which a processing request from another information processing device is stored in the operation information at a time of receiving a processing request from the one information processing device, the execution authorization unit transmits the error response to the one information processing device.

5. The control device according to claim 4, wherein the execution authorization unit transmits the error response to the one information processing device by adding data indicating the other information processing device.

* * * * *